United States Patent
Kondo et al.

(10) Patent No.: US 7,181,355 B2
(45) Date of Patent: Feb. 20, 2007

(54) AUTOMATIC QUALITY CONTROL METHOD FOR PRODUCTION LINE AND APPARATUS THEREFOR AS WELL AS AUTOMATIC QUALITY CONTROL PROGRAM

(75) Inventors: Haruhiko Kondo, Yokohama (JP); Tomoaki Kubo, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/293,307

(22) Filed: Dec. 5, 2005

(65) Prior Publication Data

US 2006/0080055 A1 Apr. 13, 2006

Related U.S. Application Data

(63) Continuation of application No. 09/985,364, filed on Nov. 2, 2001.

(30) Foreign Application Priority Data

Nov. 6, 2000 (JP) ............................. 2000-338214

(51) Int. Cl.
   *G06F 19/00* (2006.01)
(52) U.S. Cl. .......................... 702/84; 702/81; 700/108; 700/109
(58) Field of Classification Search .................... None
   See application file for complete search history.

(56) References Cited

U.S. PATENT DOCUMENTS

| 5,111,404 | A | 5/1992 | Kotani |
| 5,935,334 | A | 8/1999 | Fong et al. |
| 5,964,980 | A | 10/1999 | Robinett |
| 6,061,640 | A | 5/2000 | Tanaka et al. |
| 6,466,314 | B1 | 10/2002 | Lehman |
| 6,516,237 | B1 * | 2/2003 | Aoki et al. ................... 700/95 |
| 6,751,517 | B1 * | 6/2004 | Chou et al. .................. 700/121 |
| 6,823,287 | B2 * | 11/2004 | Shafer et al. ............... 702/183 |
| 2002/0032495 | A1 * | 3/2002 | Ozaki .......................... 700/108 |
| 2003/0109945 | A1 * | 6/2003 | Cho et al. ..................... 700/95 |
| 2003/0149501 | A1 * | 8/2003 | Tuszynski .................... 700/97 |
| 2003/0167238 | A1 * | 9/2003 | Zeif ............................. 705/400 |
| 2004/0117050 | A1 * | 6/2004 | Oskin et al. ................. 700/108 |
| 2005/0065752 | A1 * | 3/2005 | Shafer et al. ............... 702/183 |
| 2005/0071037 | A1 * | 3/2005 | Strang ......................... 700/121 |

FOREIGN PATENT DOCUMENTS

| JP | 8-32281 | 2/1996 |
| JP | 2000-252179 | 9/2000 |

* cited by examiner

*Primary Examiner*—Patrick J. Assouad
(74) *Attorney, Agent, or Firm*—Oblon, Spivak, McClelland, Maier & Neustadt, P.C.

(57) ABSTRACT

Production condition data and product quality data in a production line are monitored and stored in a production history database. When a quality deterioration event in the production line is detected while checking the product quality data, the improvement contents of the quality deterioration factor and production conditions are extracted. The extracted results and pre-stored quality improvement history data are collated with each other in order to confirm the validity thereof, and a simulation of the phenomenon of the production line is executed in order to verify the correctness. When the validity and correctness are verified, the production condition for the production line are revised to improve the quality deterioration factor.

22 Claims, 6 Drawing Sheets

| Serial NO. | Date | Outside temperature | Humidity | Hot water ejecting time | Kinetic viscosity | Application amount | Error code |
|---|---|---|---|---|---|---|---|
| | | | | | | | |

Production condition data 20 / Product quality data 21

FIG. 4

| Date | Quality deterioration contents (Error code) | Deterioration factor | Improvement contents | Improvement result |
|---|---|---|---|---|
| 2001/11/6 | Irregularity of red fluorescent material frequently occurs | Low outside temperature, high kinetic viscosity | Extension of hot water ejection, revision of upper limit of kinetic viscosity | Error rate back to normal |

AUTOMATIC QUALITY CONTROL METHOD FOR PRODUCTION LINE AND APPARATUS THEREFOR AS WELL AS AUTOMATIC QUALITY CONTROL PROGRAM

CROSS-REFERENCE TO RELATED APPLICATIONS

This application is based upon and claims the benefit of priority from the prior Japanese Patent Application No. 2000-338214, filed Nov. 6, 2000, the entire contents of which are incorporated herein by reference.

BACKGROUND OF THE INVENTION

1. Field of the Invention

The present invention relates to a quality control method for a production line which automatically carries out quality control of the line, which can be applied to various types of production lines such as lines for color-cathode ray tubes and semiconductor devices, and an apparatus used for the method, as well as an automatic quality control program.

2. Description of the Related Art

Production lines are designed for various types of products such as color cathode ray tubes and semiconductor devices. In the production lines, the quality of the products is controlled while they are produced.

In quality control, first, data indicating the quality of part of the products out of a great number produced on the line is sampled. The product quality data includes the results of tests carried out on products in accordance with their type, for example, the results of performance tests of the product or the results of the examination of the appearance.

Next, the overall distribution and the degree of dispersion of the sampling data are obtained. Then, the relationship between the production condition for a product and the product quality is grasped from the overall distribution and the degree of dispersion. Thus, from the relationship between the production condition and the product quality, the quality of the product is controlled.

In the quality control of a product, there is a method in which detailed examination data of the product is sampled, and defect analysis of the product is carried out by using this sampling data.

However, in many cases, the just-mentioned quality control method can only be performed by operators highly skilled in manipulation, adjustment and operation of the production line. That is, operators, who have extensive and long-term experience regarding the product and production on the production line, lean an empirical rule specially for operating the production line and have obtained skills for improving the production line.

At present, the technology for monitoring network databases, etc. has been developed, and therefore the quality management of the product is conducted on the basis of the database. In quality control, identification data such as a bar code is assigned to each and every one of the products conveyed on the production line, and the production condition data and the quality data of each and every product is stored. In this manner, quality control of the individual products can be relatively easily achieved.

In product quality control, if a great amount of data (production history data) such as production conditions and product quality of a great number of products produced is utilized effectively, it is considered possible to achieve more precise control over the quality.

However, there is a certain limit to the data processing ability of human being. Further, in the defect analysis of the products on the basis of the detailed data, the gauge of the analysis, in many cases, depends on the judgment and/or intuition of the operator who has a special empirical rule and an improving skill, and therefore the effective application of the data is further interrupted.

To summarize, with the quality control method for products, which conventionally much depends on the human factors, it is difficult to control the quality of the products by effectively making a full use of a huge amount of product history data of a great number of products.

Under the circumstances, the object of the present invention is to provide an automatic quality control method for a production line, which can effectively make a full use of a huge amount of data by overcoming the limits of the data processing capabilities of human systems or the ambiguities innate to empirical and intuitive methods of humans, and the apparatus therefor, as well as an automatic quality control program.

BRIEF SUMMARY OF THE INVENTION

According to an aspect of the present invention, there is provided an automatic quality control method for a production line, comprising: monitoring a plurality of production condition data for manufacturing products from a production line and product quality data indicating quality of manufactured products; storing the production condition data and product quality data thus monitored in a database; checking the production condition data to detect whether or not there is an event which deteriorates the quality of products; extracting, if a quality deteriorating event is detected, a quality deteriorating factor which causes the quality deteriorating event and improvement contents of production conditions against the quality deteriorating factor on the basis of the quality deteriorating event and the production condition data; collating the quality deteriorating factor and improvement contents thus extracted with improvement examples pre-stored for possible quality deteriorating factors and confirming the validity of the quality deteriorating factor and improvement contents; executing a simulation of manufacture of a product in the production line based on the quality deteriorating factor and improvement contents thus extracted, and verifying the correctness of the quality deteriorating factor and the validity of the improvement contents, extracted from the result of the simulation; and if the correctness of the quality deteriorating factor and the validity of the improvement contents are verified, the production conditions for the production line in accordance with the improvement contents.

According to another aspect of the present invention, there is provided an automatic quality control apparatus for a production line, comprising: a production line configured to produce products; a first database configured to store a plurality of production condition data for producing the products and product quality data indicating quality of the products; a monitoring section configured to monitor a plurality of product condition data for production the products from the production line and further monitor the product quality data indicating the quality of the products, to store them in the first database; an extraction section configured to check the production condition data to detect whether or not there is an event which deteriorate the quality of products, and to extract a quality deteriorating factor which causes the quality deteriorating event and improvement contents of production conditions regarding the quality deteriorating factor on the basis of the quality deteriorating event and the production condition data; a second database configured to store, in advance, improvement examples for the quality deterioration factor; a validity confirming section configured to confirm the validity of the quality deteriorating factor and improvement contents by collating the quality deteriorating factor and improvement contents extracted by the extracting section with the improvement examples pre-stored in the second database; a verifying section configured to execute a simulation of production of the products in the production line under current production conditions, and to verify the correctness of the quality deteriorating factor and the validity of the improvement contents from a result of the simulation; and a feedback control section configured to revise the production conditions for the production line in accordance with the improvement contents when the correctness of the quality deteriorating factor and the validity of the improvement contents are verified.

According to still another aspect of the present invention, there is provided an automatic quality control program for a production line, comprising: monitoring a plurality of production condition data for manufacturing color cathode ray tubes from a production line and product quality data indicating quality of manufactured products; storing the production condition data and product quality data thus monitored in a database; checking the production condition data to detect whether or not there is an event which deteriorate the quality of products; extracting, if a quality deteriorating event is detected, a quality deteriorating factor which causes the quality deteriorating event and improvement contents of production conditions against the quality deteriorating factor on the basis of the quality deteriorating event and the production condition data; collating the quality deteriorating factor and improvement contents thus extracted with improvement examples pre-stored for possible quality deteriorating factors and confirming the validity of the quality deteriorating factor and improvement contents; executing a simulation of manufacture of a product in the production line based on the quality deteriorating factor and improvement contents thus extracted, and verifying the correctness of the quality deteriorating factor and the validity of the improvement contents, extracted from the result of the simulation; and if the correctness of the quality deteriorating factor and the validity of the improvement contents are verified, the production conditions for the production line in accordance with the improvement contents.

As described above, there is provided, according to the present invention, an automatic quality control method for a production line, which can effectively make a full use of a huge amount of data by overcoming the limits of the data processing capabilities of human systems or the ambiguities innate to empirical and intuitive methods of humans, and the apparatus therefor, as well as an automatic quality control program.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The first embodiment of the present invention will now be described with reference to accompanying drawings.

Figure 1:
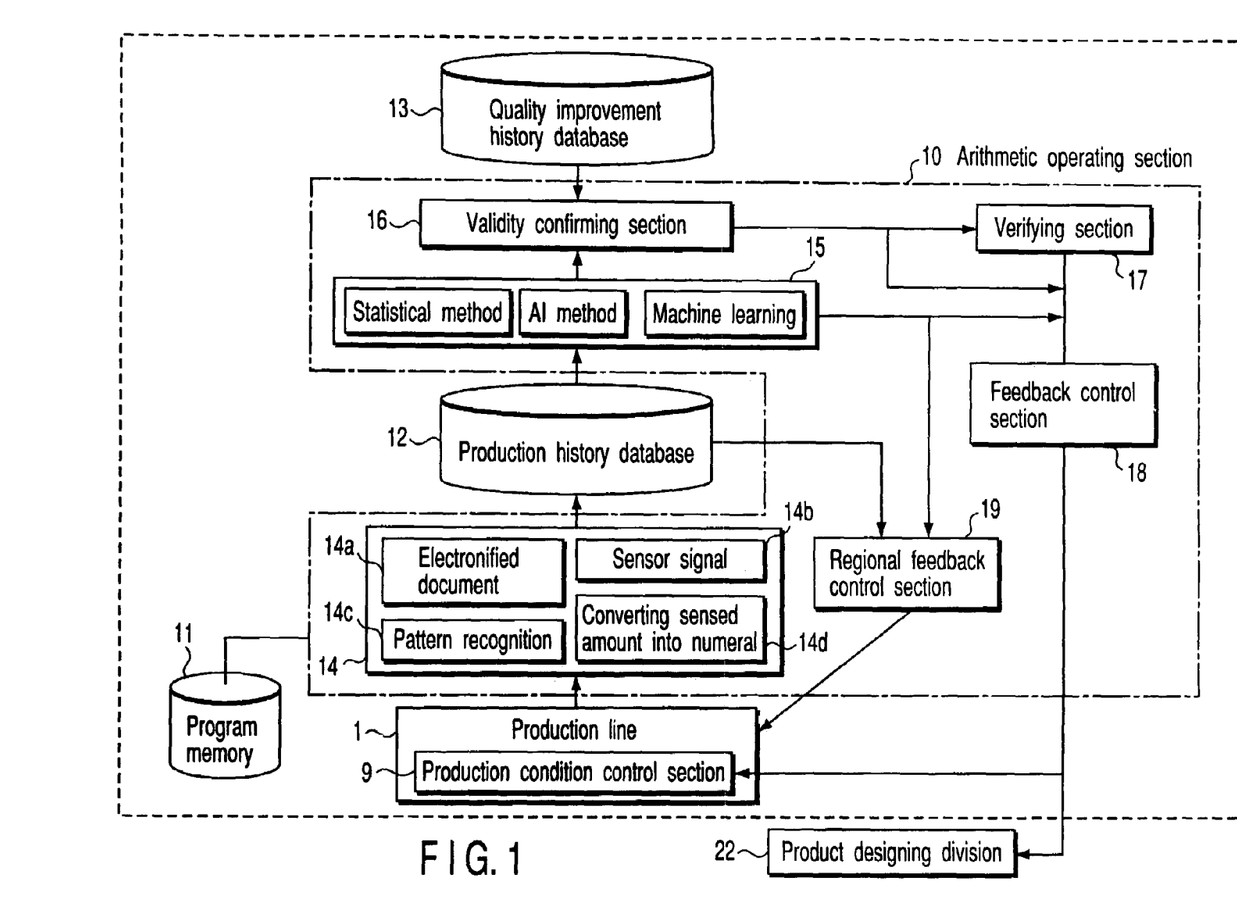
FIG. 1 is a block diagram showing a structure of a first embodiment of an automatic quality control apparatus for a production line, according to the present invention.
Figure 2:
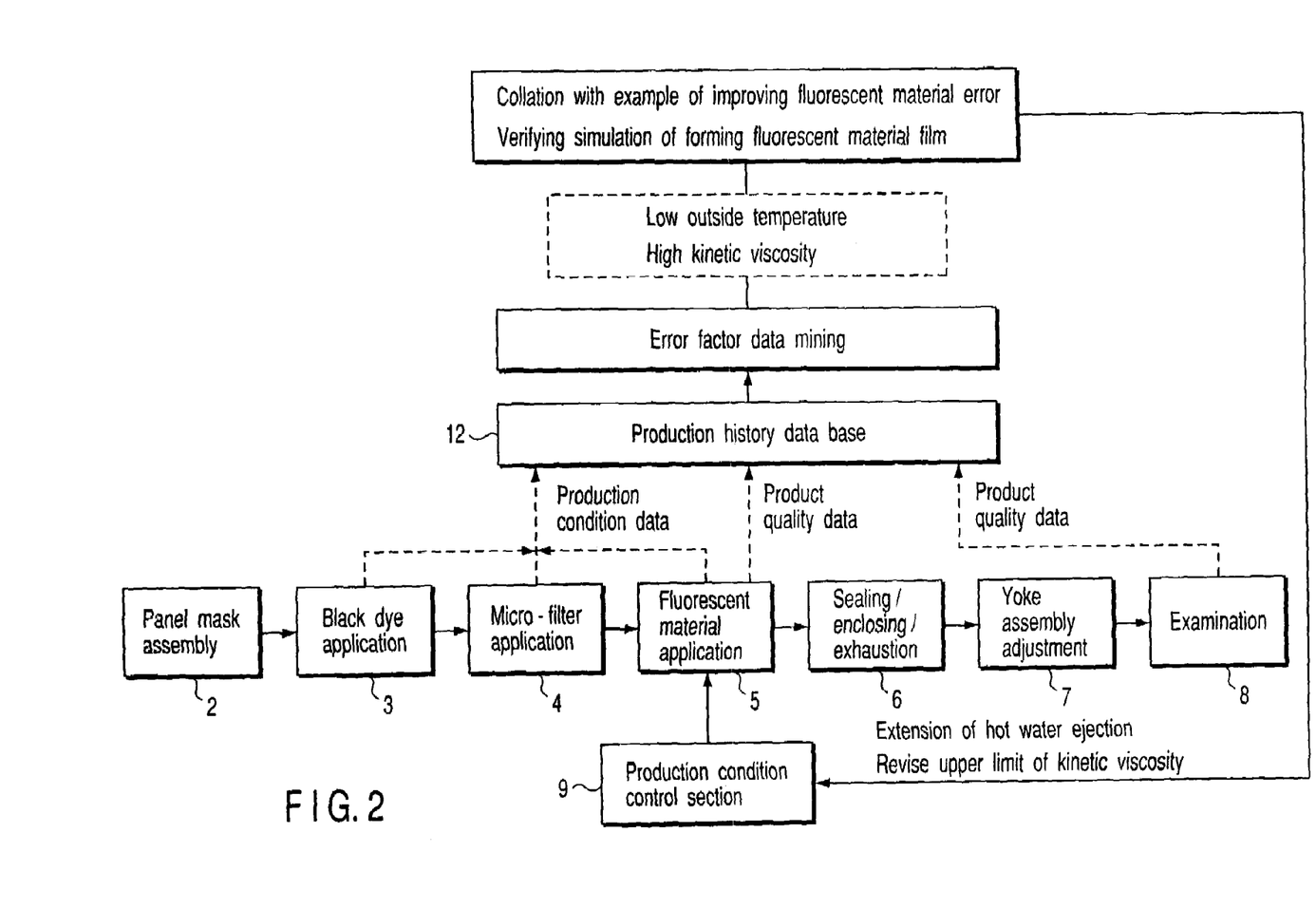
FIG. 2 is a diagram showing a production line for a color-cathode ray tube, which is applied to the first embodiment of the automatic quality control apparatus for a production line, according to the present invention.

FIG. 1 is a block diagram showing a structure of an automatic quality control apparatus for a production line. A production line 1 is an example of a generally known production line for a color cathode ray tube. The production line 1, as shown in FIG. 2, includes a panel mask assembly process 2, a black body application process 3, a micro-filter application process 4, a fluorescent material application process 5, a sealing/enclosing/exhaustion process 6, a yoke assembly adjustment process 7 and an examination process 8.

The production conditions for the color cathode ray tube in the production line 1 are, for example, the outside temperature, humidity, the hot water ejection time for ejecting hot water to the glass panel of the color cathode ray tube, the kinetic viscosity of the solution used for applying the fluorescent material, and the amount of the fluorescent material applied. Other than these, there are a great number of production conditions for the color cathode ray tube.

A production condition control section 9 controls each of a plurality of production conditions in the production line 1 for producing color cathode ray tubes.

Another example of the production line 1 is a line for semiconductor devices. The production line 1 for semiconductor devices includes, for example, a film forming process, a resist application process, an exposure process, development process, an etching process and a resist removing process.

A production condition control section 9 of the production line for semiconductor devices controls, for example, the temperature, humidity, resist viscosity, application force of the resist, and the application amount of the resist, with regard to the production line 1 for semiconductor devices.

The production line 1 is not limited to the manufacture of color cathode ray tubes or semiconductor devices, but it can be a line for a variety of types of products.

An arithmetic operating section 10 is connected to a program memory 11, a production history database 12 and a quality improvement history database 13.

The program memory 11 stores an automatic quality control program. The details of the automatic quality control program, which will be described in detail later, include the following seven procedures.

Figure 3:
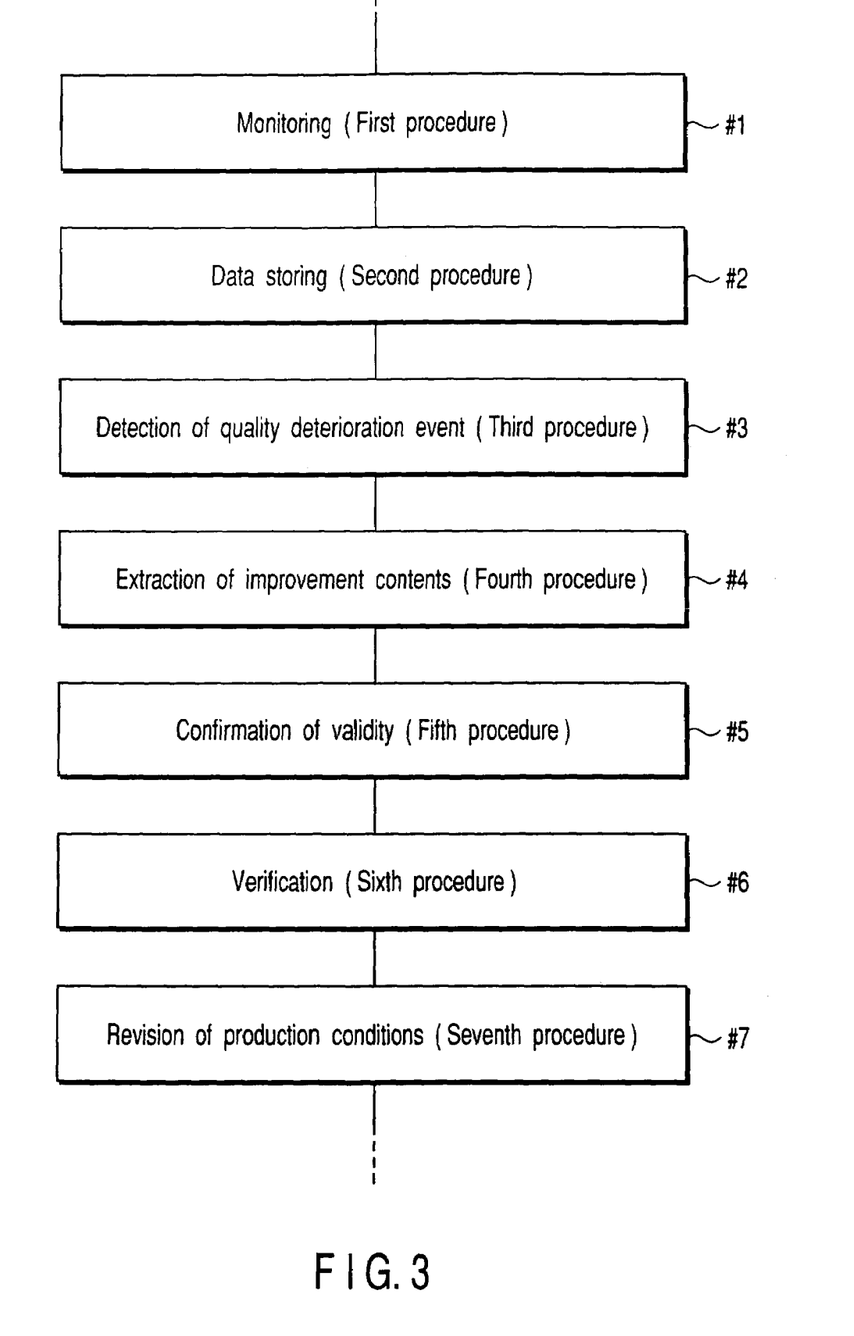
FIG. 3 is a diagram showing a procedure of an automatic quality control program in the first embodiment of the automatic quality control apparatus is for a production line, according to the present invention.

That is:

(1) The first procedure (step #1) in which a plurality of production condition data for manufacturing color cathode ray tubes are monitored from the production line 1 and product quality data indicating the qualities of manufactured products are monitored;

(2) The second procedure (step #2) in which the production condition data and product quality data thus monitored are stored in the production history database 12;

(3) The third procedure (step #3) in which the production condition data are monitored and whether or not there is an event which deteriorates the quality of products is detected;

(4) The fourth procedure (step #4) in which if a quality deteriorating event is detected, a quality deteriorating factor which causes the quality deteriorating event and improvement contents of production conditions against the quality deteriorating factor are extracted on the basis of the quality deteriorating event and the production condition data;

(5) The fifth procedure (step #5) in which the quality deteriorating factor and improvement contents thus extracted are collated with improvement examples pre-stored for possible quality deteriorating factors to confirm the validity of the quality deteriorating factor and improvement contents;

(6) The sixth procedure (step #6) in which a simulation of manufacture of a product is executed in the production line 1 based on the quality deteriorating factor and improvement contents thus extracted, to verify the correctness of the quality deteriorating factor and the validity of the improvement contents, extracted from the result of the simulation; and (7) The seventh procedure (step #7) in which if the correctness of the quality deteriorating factor and the validity of the improvement contents are verified, the production conditions for the production line 1 are revised in accordance with the improvement contents.

The arithmetic operating section 10 is designed to execute the automatic quality control program stored in the program memory 11, and includes a monitoring section 14, an extracting section 15, a validity confirming section 16, a verifying section 17, a feedback control section 18 and a regional feedback control section 19.

The monitoring section 14 monitors a plurality of production condition data and product quality data in the production line 1, and stores these product quality data in the production history database 12.

The monitoring section 14 monitors production condition data from each of a plurality of processes in the line 1 for color cathode ray tube shown in, for example, FIG. 2, such as the black dye application process 3, the micro-filter application process 4 and the fluorescent material application process 5.

Further, the monitoring section 14 monitors product quality data from each of a plurality of processes in the line 1 for color cathode ray tube shown in, for example, FIG. 2, such as the fluorescent material application process 5 and the examination process 8.

If the production condition data and the product quality data are documents, the monitoring section 14 creates an electronic file 14*a* (electronified document) from the documents, and stores it in the production history database 12.

If the production condition data and the product quality data are sensor signals, the monitoring section 14 monitors the sensor signals and converts them into digital signals (digital sensor signals 14*b*), and stores the digital signal in the production history database 12.

If the production condition data and the product quality data are images, the monitoring section 14 carries out pattern recognition 14*c* on the images, and stores them in the production history database 12.

If the production condition data and the product quality data are sensed amount by human (operator), the monitoring section 14 converts the sensed amount into a numerical value (conversion of sensed amount into numeral 14*d*) according to a specific algorithm, and stores it in the production history database 12.

Figure 4:
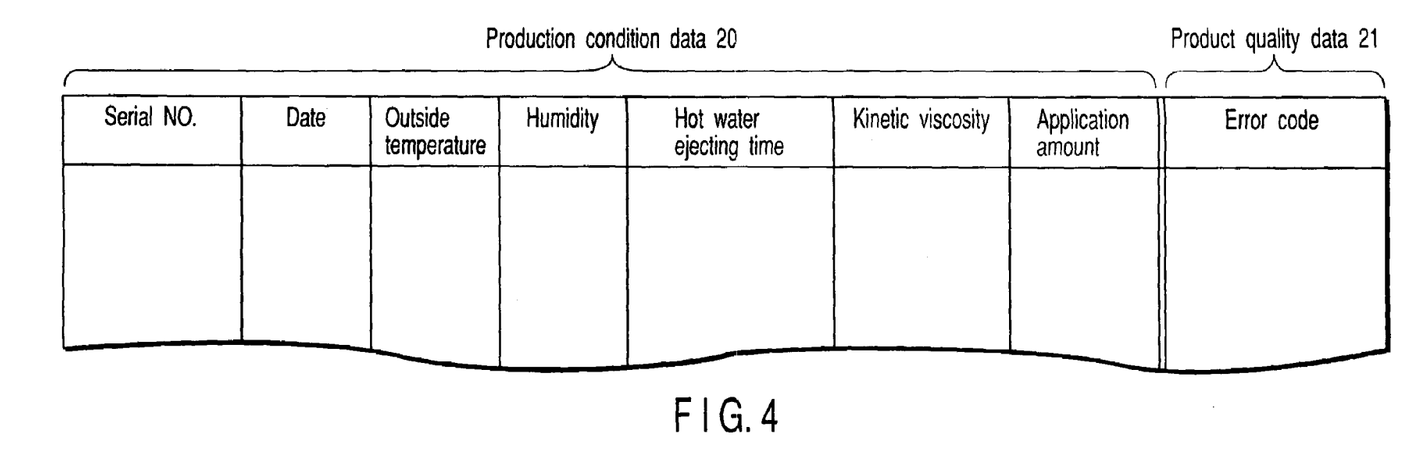
FIG. 4 is a schematic diagram showing production condition data and product quality data in the first embodiment of the automatic quality control apparatus for a production line, according to the present invention.

The production history database 12 stores the production condition data 20 and the product quality data 21 shown in FIG. 4.

In the case of manufacture of color cathode ray tube, the production condition data 20 include the serial number (serial No.) of each color cathode ray tube, the date, the outside temperature, the humidity, the hot water ejecting time, the kinetic viscosity of the fluorescent material slurry, the application amount of the fluorescent material slurry and the like, as shown in FIG. 4.

In the case of manufacture of semiconductor devices, the production condition data 20 include the serial number (serial No.) of each semiconductor device, the date, the temperature, the humidity, the viscosity of the resist, the application force of the resist and the like.

Other than those mentioned above, the production condition data 20 include the flow amount of the process gas and the pressure thereof.

The product quality data 21 indicate the quality of a produced color cathode ray tube. The product quality data 21 include the judgment result data, the examination result data and the quality data.

The judgment result data indicates whether or not the appearance and function of the produced color cathode ray tube are respectively those as designed in advance.

The quality data indicates the yield in the manufacture of color cathode ray tubes, and the percent defective in the color cathode ray tubes.

A specific example of the product quality data 21 is to indicate how white the screen is displayed when a white color is displayed on the screen of the color cathode ray tube. In this case, if the displayed screen is not a white color of a certain degree, an error code indicating a whitening error is stored.

The extraction section 15 checks the product quality data 21 stored in the production history database 12, and detects whether or not there is a quality deterioration event (error code) in the manufacture of the color cathode ray tubes. The items to be detected while checking the product quality data 21 are a sudden variation in the occurrence rate of the quality deterioration event as well as whether or not the yield of the color cathode ray tubes stays at the level of the original yield.

For example, a sudden variation in the occurrence rate of the quality deterioration event can be detected, for example, by obtaining the occurrence rate of an error code and watching if the occurrence rate abruptly increases within a certain time period.

Whether or not a yield stays at its original level, can be detected, for example, by obtaining the yield of color cathode ray tubes from the occurrence of an error code and watching if the yield stays at its original level along with time elapse.

When a sudden variation in the occurrence rate of the quality deterioration event or the staying of a yield at its original level is detected, the extracting section 15 extracts the quality deterioration factor which causes the quality deterioration event and the improvement contents of the production condition data 20 for the quality deterioration factor, based on the quality deterioration factor and the production condition data 20.

More specifically, the extracting section 15 executes a data mining algorithm on the bases of the quality deterioration event and the production condition data, and extracts the improvement contents.

The data mining algorithm is a processing procedure, by way of executing a software, for extracting useful data from a huge amount of production condition data 20 and product quality data 21 stored in the production history database 12 using various types of methods such as a statistical method, an artificial intelligence (AI) method and a machine learning method.

Typical and specific examples of the data mining algorithm in terms of the statistical method are correlation analysis, multiple regression analysis and variance analysis. In terms of the artificial intelligence (AI) method, an example thereof is an analysis of the significance of a factor by neural network leaning. In terms of the machine leaning method, an example thereof is a process of classification based on various types of indexes such as a square value of x, the entropy of data and the purity of data.

The quality improvement history database 13 stores improvement examples for quality deterioration factors in advance. In specific, the quality improvement history database 13 stores already known factors for the occurrence of errors and a decrease in the yield, and improvement examples as quality improvement history data. Naturally, the quality improvement history data have been digitized.

Figure 5:
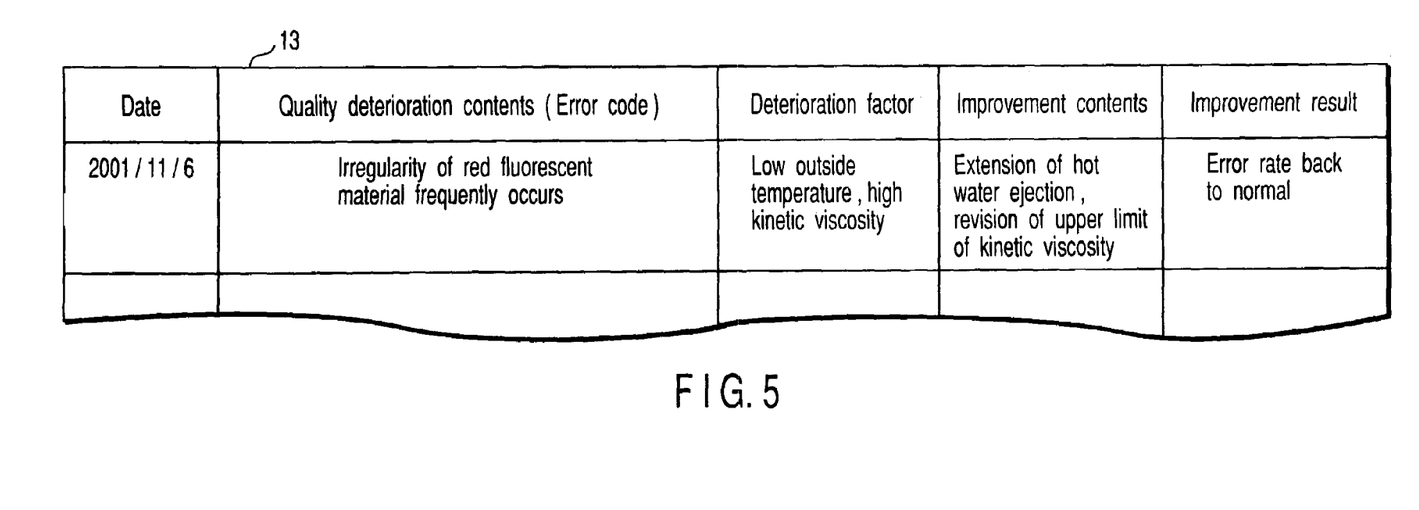
FIG. 5 is a schematic diagram showing a quality improvement history database in the first embodiment of the automatic quality control apparatus for a production line, according to the present invention.

The quality improvement history data, which includes quality deterioration factors, the contents of the quality deterioration factors and the improvement contents for the quality deterioration factors, are stored in the form of, for example, "if-then" expression. FIG. 5 is a schematic diagram of the quality improvement history database 13. The quality improvement history data includes, for example, the date, the contents of the quality deterioration (error code), the deterioration factors, the improvement contents and the improvement results. For example, the following items are stored. That is, the column of the date indicating "2001/11/6", the column of the quality deterioration contents indicating "frequent occurrence of irregularity of the red fluorescent material of color cathode ray tube" the column of the deterioration factors indicating "low external temperature and high kinetic viscosity", the column of the improvement contents indicating "extension of hot water ejection and change in upper limit of kinetic viscosity" and the column of the improvement results indicating "error occurrence rate back to normal".

The validity confirming section 16 collates the quality deterioration factor and the improvement contents extracted from the extracting section 15 with the quality improvement history data pre-stored in the quality deterioration history database 13, in order to confirm the validity of the quality deterioration factor and the improvement contents.

The verifying section 17 executes a simulation of a phenomenon regarding the production line 1 according to the quality deterioration factor and the improvement contents extracted by the extracting section 15, that is, a simulation for analyzing a basic physiochemical phenomenon regarding the manufacture of color cathode ray tubes. From the result of the simulation, the correctness of the quality deterioration factor and the validity of the improvement contents are verified.

In other words, the verifying section 17 verifies if the quality deterioration factor extracted by the extracting section 15 is correct. The section further verifies, when the production condition data of the production line 1 are revised to the improvement contents extracted by the extracting section 15, whether or not a trouble occurs in the production line 1.

The feedback control section 18 transmits a feedback control signal for revising the production conditions for the production line 1 in accordance with the improvement contents, to the production condition control section 9 when the correctness of the quality deterioration factor and the validity of the improvement contents are verified by the verifying section 17.

The feedback control signal transmitted from the feedback control section 18 is sent also to, for example, a CAD (computer aided design) of a production design division 22. Therefore, upon reception of the feedback control signal indicating the improvement contents, the production design division 22 can reflect the improvement contents to the designing of the production line 1 with use of the CAD.

The regional feedback control section 19 receives the product quality data 21 stored in the production history database 12 and the quality deterioration event in the production line 1, which is extracted by the extracting section 15, controls the production line 1 regionally, for example, controls only the temperature of the resist to an appropriate value, and notifies a warning or the like if necessary depending on the quality deterioration event.

The regional feedback control section 19 controls each and individual production condition to fall within a set value range. Thus, those quality deterioration factors which can be relatively easily solved can be overcome.

However, in some cases, there are other quality deteriorating factors which cannot be overcome even if each individual production condition is controlled by the regional feedback control section 19. These factors are, as mentioned above, a sudden variation of the occurrence rate of the quality deterioration event- and a yield staying at its original level.

The apparatus of the present invention performs the quality control operation when a sudden variation of the occurrence rate of the quality deterioration event or staying of a yield at its original level occurs.

The operation of the apparatus having the above-described structure will now be described by following the procedure of the automatic quality control program shown in FIG. 3.

The production line 1 is designed to manufacture color cathode ray tubes as shown in FIG. 2 through the panel mask assembly process 2, the black dye application process 3, the micro-filter application process 4, the fluorescent material application process 5, the sealing/enclosing/exhaustion process 6, the yoke assembly adjustment process 7 and the examination process 8 in order.

While the production line 1 is in operation, the monitoring section 14, in step #1, monitors production condition data from each of a plurality of processes in the line 1 for color cathode ray tube shown in, for example, FIG. 2, such as the black dye application process 3, the micro-filter application process 4 and the fluorescent material application process 5.

Here, the production condition data include, as shown in FIG. 4, for example, the serial number (serial No.), the date, the outside temperature, the humidity, the hot water ejecting time, the kinetic viscosity of the fluorescent material slurry, the application amount of the fluorescent material slurry, the machine number of the device used for a respective process, the physical property of the liquid agent and the like.

At the same time, the monitoring section 14 monitors product quality data from each of a plurality of processes in the production line 1 for color cathode ray tube shown in, for example, FIG. 2, such as the fluorescent material application process 5 and the examination process 8.

The product quality data from the fluorescent material application process 5 includes, for example, data regarding splashing of the fluorescent material while applying the fluorescent material slurry onto the glass panel of a color cathode ray tube, attachment of dust, irregularity of the application of the fluorescent material and bubbles created while applying the slurry. Three colors of fluorescent materials, namely, R (red), G (green) and B (blue) are applied.

Regarding the product quality data 21, if there is an error in, for example, a color-cathode ray tube, an error code which indicates a deterioration event of the error is stored in the production history database 12.

Next, the monitoring section 14, in step #2, stores the production condition data 20 and the product quality data 21 monitored, in the production history database 12.

In the case where data are to be stored in the production history database 12, if the production condition data and the product quality data are documents, the monitoring section 14 creates an electronic file 14a (electronified document) from the documents, and stores it in the production history database 12.

If the production condition data and the product quality data are sensor signals, the monitoring section 14 monitors the sensor signals and converts them into digital signals (digital sensor signals 14b), and stores the digital signal in the production history database 12.

If the production condition data and the product quality data are images, the monitoring section 14 carries out pattern recognition 14c on the images, and stores them in the production history database 12.

If the production condition data and the product quality data are sensed amount by human (operator), the monitoring section 14 converts the sensed amount into a numerical value (conversion of sensed amount into numeral 14d) according to a specific algorithm, and stores it in the production history database 12.

Next, the extracting section 15, in step #3, sections the product quality data 21 stored in the production history database 12 and detects if there is a sudden variation in the occurrence rate of the quality deterioration event, or whether or not the yield of the color cathode ray tubes stays at the level of the original yield.

When the extracting section 15 detects that there is a sudden variation in the occurrence rate of the quality deterioration event, or the yield of the color cathode ray tubes stays at the level of the original yield, the extracting section 15, in step #4, executes a data mining algorithm on the bases of the quality deterioration event and the production condition data 20, and extracts the quality deterioration factor which causes the quality deterioration event and the improvement contents of the production condition data 20 with regard to the quality deterioration factor.

For example, when the extracting section 15 checks the product quality data 21 stored in the production history database 12 and detects that there is a sudden variation in the occurrence rate of the error code indicating the irregularity of the red fluorescent material, the extracting section 15 executes the data mining algorithm on the bases of the irregularity of the red fluorescent material (quality deterioration event) and the production condition data 20, and extracts the quality deterioration factor which causes the irregularity of the red fluorescent material and the improvement contents thereof.

More specifically, in the case where the outside temperature is low at the point when glass panels before the application of the fluorescent materials are loaded, and the kinetic viscosity of the red fluorescent material slurry is high, the extracting section 15 extracts that the irregularity of the red fluorescent material frequently occurs, as well as the improvement contents therefor, that is, the temperature at the point when the glass panels are loaded and the kinetic viscosity of the red fluorescent material are adjusted.

Next, the validity confirming section 16, in step #5, collates the quality deterioration factor and the improvement contents extracted from the extracting section 15 with the quality improvement history data pre-stored in the quality deterioration history database 13, in order to confirm the validity of the quality deterioration factor and the improvement contents.

After that, the verifying section 17, in step #6, executes a simulation of a phenomenon regarding the production line 1 according to the quality deterioration factor and the improvement contents extracted by the extracting section 15, that is, a simulation for analyzing a basic physiochemical phenomenon regarding the manufacture of color cathode ray tubes. From the result of the simulation, the correctness of the quality deterioration factor and the validity of the improvement contents are verified.

In other words, the verifying section 17 verifies if the quality deterioration factor extracted by the extracting section 15 is correct. The section further verifies, when the production condition data of the production line 1 are revised to the improvement contents extracted by the extracting section 15, whether or not a trouble occurs in the production line 1.

More specifically, the verifying section 17 executes a simulation of the fluorescent material application process 5, and obtains the following simulation results. That is, when glass panels having a very low temperature, which is caused by a low outside temperature, are loaded, the temperature of each glass panel becomes uneven from one place to another within it until it reaches the fluorescent material application process 5. When a fluorescent material having a high kinetic viscosity is injected in the above-described state, an irregularity is created in the fluorescent material film. Further, if the hot water injecting time which can adjust the temperature of each glass is extended and the upper limit value of the kinetic viscosity of the fluorescent material slurry is lowered so as to improve the above situation, there will creates no problem as a basic physiochemical phenomenon of the application of a fluorescent material.

Thus, the verifying section 17 confirms the correctness of the quality deterioration factor and the validity of the improvement contents when the deterioration factors (low outside temperature and high kinetic viscosity) for the past quality deterioration contents (frequent occurrence of irregularity of the red fluorescent material) and the improvement contents (extension of hot water ejection and revision of the upper limit of the kinetic viscosity), which are stored in the quality improvement history database 13, match with the simulation results described above.

Next, the feedback control section 18, in step #7, transmits a feedback control signal for revising the production conditions for the production line 1 in accordance with the improvement contents, to the production condition control section 9 when the correctness of the quality deterioration factor and the validity of the improvement contents are verified by the verifying section 17.

For example, the feedback control section 18 transmits the feedback control signal indicating the improvement contents, that is, the extension of the hot water ejecting time for stabilizing the temperature of the glass panel of each color cathode ray tube, and the lowering of the upper limit value of the kinetic viscosity of the fluorescent material slurry.

Then, upon reception of the feedback control signal, the production condition control section 9 extends the hot water ejecting time in the fluorescent material application process 5 and lowers the upper limit value of the kinetic viscosity of the fluorescent material slurry.

The regional feedback control section 19 receives the product quality data 21 stored in the production history database 12 and the quality deterioration event in the production line 1, which is extracted by the extracting section 15, controls the production line 1 regionally, for example, controls only the temperature of the resist to an appropriate value, and notifies a warning or the like if necessary depending on the quality deterioration event.

As described above, in the first embodiment, the production condition data 20 and the product quality data 21 in the production line 1 are monitored, and stored in the production history database 12. While checking the product quality data 21, if a sudden variation in the occurrence rate of the quality deterioration event or the staying of a yield at its original level is detected in the production line 1, the quality deterioration factor and the improvement contents are extracted on the basis of the quality deterioration event and the production condition data 20. Then, the extracted results are collated with the quality improvement history data pre-stored so as to confirm the validity thereof, and further a simulation of a phenomenon regarding the production line 1 according to the quality deterioration factor and the improvement contents is executed so as to verify the correctness thereof. When the validity and correctness are verified, the production conditions are revised in accordance with the improvement contents.

That is, a series of operations, that is, monitoring and making database of production history data, checking of quality data, extraction of quality deterioration factor and improvement contents, confirmation of the validity/correctness of the factor and improvement contents and feedback of the result to the production conditions for improvement, can be continuously carried out in cycles by means of software.

In this manner, it is possible to achieve an automatic quality control which can effectively make a full use of a huge amount of data by overcoming the limit of the data processing capability by the human system or the ambiguity innate to human empirical rule or intuition.

Thus, it is possible to achieve an automatic quality control which can effectively make a full use of a huge amount of data obtained by monitoring the production condition data 20 and the product quality data 21.

It should be noted here that a result still in progress in the above-described automatic cycle by way of software can be utilized for a regional feedback control, the management of the human system or the like. Further, the result of the verification obtained from the simulation can be fed back to the designing of the subsequent product.

Next, the second embodiment of the present invention will now be described with reference to an accompanying drawing. The same structural parts as those shown in FIG. 1 are designated by the same reference numerals, and the detailed descriptions therefor will be omitted here.

Figure 6:
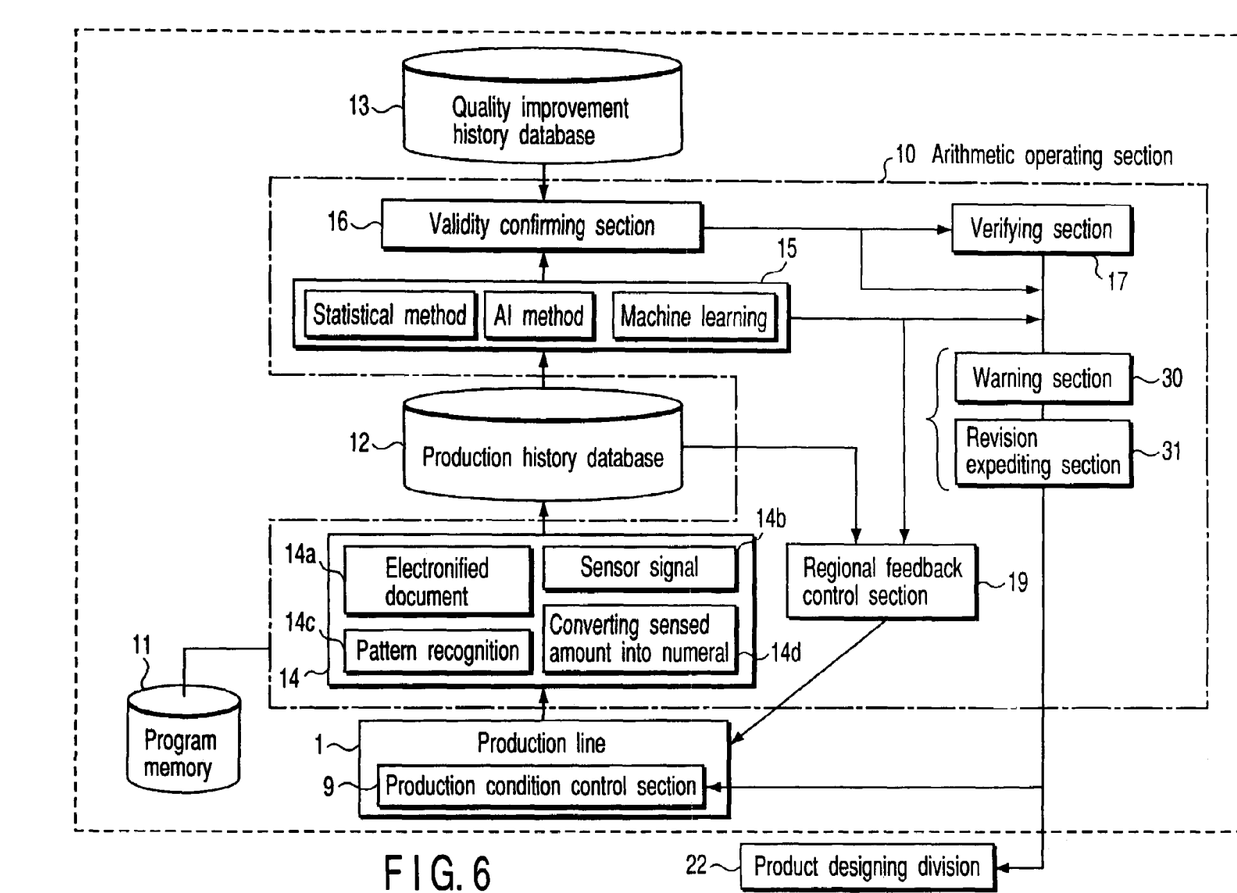
FIG. 6 is a block diagram showing a structure of a second embodiment of an automatic quality control apparatus for a production line, according to the present invention.

FIG. 6 is a block diagram showing a structure of an automatic quality control apparatus of a production line. In this apparatus, a warning section 30 and a revision expediting section 31 are provided in place of the feedback control section 18 shown in FIG. 1.

The warning section 30 and the revision expediting section 31 are operated when the validity confirming section 16 cannot confirm the validity of the quality deterioration factor and the improvement contents, and the verifying section 17 cannot verify the correctness of the quality deterioration factor and the validity of the improvement contents.

The warning section 30 output a warning indicating that it has not been able to confirm the validity and correctness.

The revision expediting section 31 presents candidates for the quality deterioration factor and requests revision of the production conditions of the line 1 for improving the quality deterioration factor.

In addition to those procedures shown in FIG. 3, the automatic quality control program stored in the program memory 11 includes a procedure in which when the validity of the quality deterioration factor and the improvement contents cannot be confirmed in the fifth procedure, and the correctness of the quality deterioration factor and the validity of the improvement contents cannot be verified in the sixth procedure, a warning indicating that it has not been able to confirm the validity and correctness is output. The program further includes a procedure in which candidates for the quality deterioration factor are presented and revision of the production conditions of the line for improving the quality deterioration factor is requested.

With the above-described structure, when the validity of the quality deterioration factor and the improvement contents cannot be confirmed by the validity confirming section 16, and the correctness of the quality deterioration factor and the validity of the improvement contents cannot be verified by the verifying section 17, the warning section 30 outputs a warning indicating that it has not been able to confirm the validity and correctness.

Meanwhile, the revision expediting section 31 presents candidates for the quality deterioration factor and requests revision of the production conditions of the line 1 for improving the quality deterioration factor.

Thus, an instruction for revising the production conditions of the line 1 for improving the quality deterioration factor is given to the operator. The operator revises the production conditions of the production line 1 for improving the quality deterioration factor.

In the first embodiment already described, candidates of the quality deterioration factor automatically extracted by various types of the data mining algorithms are difficult to understand in terms of the conventional concept, and further they cannot be estimated from a general physiochemical phenomenon. Therefore, when there is a true quality deterioration factor, the improvement by the automatic feedback is not initiated.

On the other hand, in the second embodiment, when candidates for the quality deterioration factor are automatically extracted by the revision expediting section 31, the operator is required to make a judgment whether or not the production conditions should be revised to solve the quality deterioration factor.

Thus, in addition to the effect of the first embodiment, the second embodiment can enhance the robustness of the system in a cooperation with human system and can increase the rates of the operations of the examination, finding and improvement of the quality deterioration factor, as compared to the conventional operations which are conducted only by the human system.

Next, the third embodiment of the present invention will now be described with reference to an accompanying drawing. The same structural parts as those shown in FIG. 6 are designated by the same reference numerals, and the detailed descriptions therefor will be omitted here.

Figure 7:
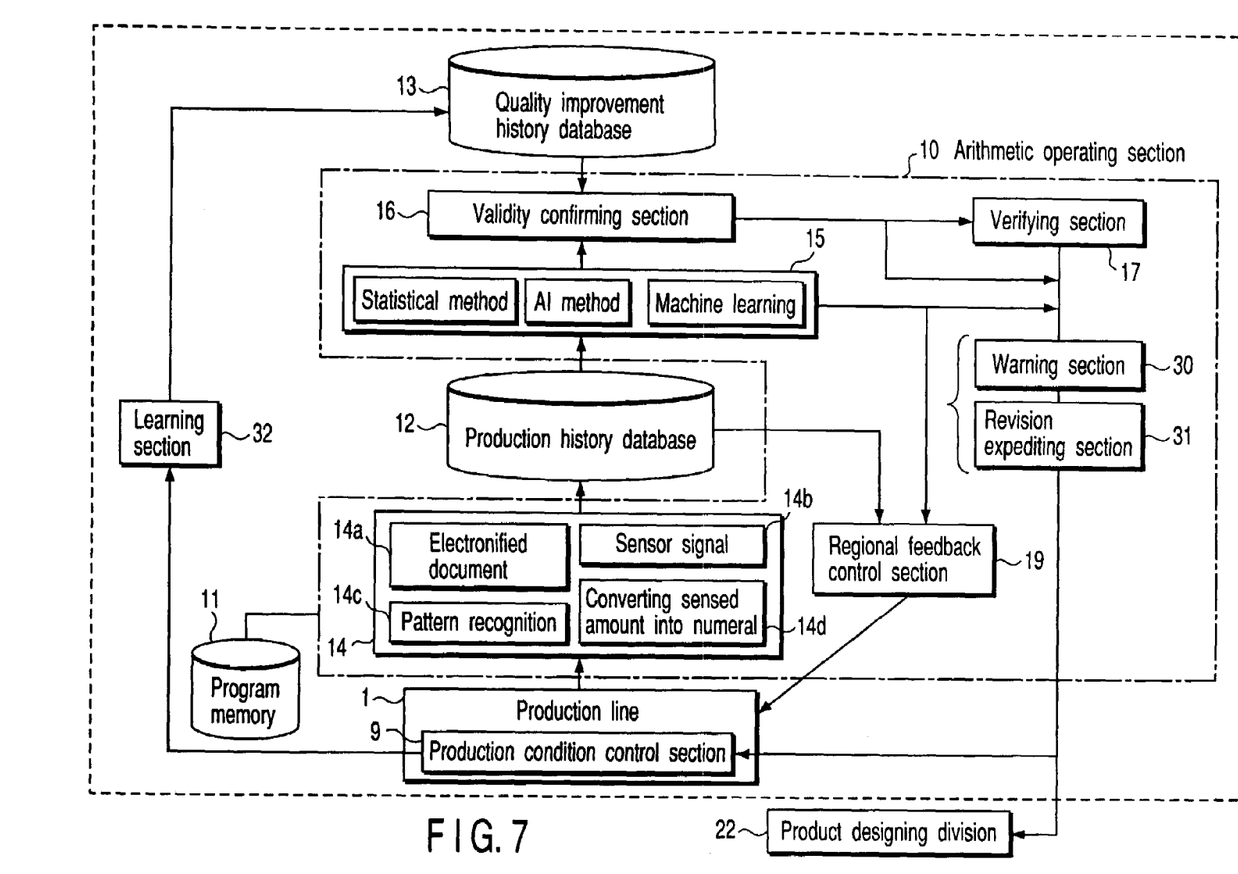
FIG. 7 is a block diagram showing a structure of a third embodiment of an automatic quality control apparatus for a production line, according to the present invention.

FIG. 7 is a block diagram showing a structure of an automatic quality control apparatus of a production line. This apparatus includes a leaning section 32. When the production line 1 is improved by revising the production conditions of the line 1 in accordance with the improvement contents as the revision is expedited by the revision expediting section 31 or the feedback control section 18, the improvement example is additionally stored in the quality improvement history database 13.

In addition to those procedures shown in FIG. 3, the automatic quality control program stored in the program memory 11 includes a procedure in which when the production line 1 is improved by revising the production conditions of the line 1 in accordance with the improvement contents by the seventh procedure, the improvement example is leaned.

It is also possible to add to this automatic quality control program a procedure in which when the validity of the quality deterioration factor and the improvement contents cannot be confirmed in the fifth procedure, and the correctness of the quality deterioration factor and the validity of the improvement contents cannot be verified in the sixth procedure, a warning indicating that it has not been able to confirm the validity and correctness is output, and another procedure in which candidates for the quality deterioration factor are presented and revision of the production conditions of the line for improving the quality deterioration factor is requested.

With the above-described structure, the feedback control section 18 transmits a feedback control signal for revising the production conditions for the production line 1 in accordance with the improvement contents, to the production condition control section 9 when the correctness of the quality deterioration factor and the validity of the improvement contents are verified by the verifying section 17.

The production condition control section 9 controls each of a plurality of production conditions in the production line 1 for producing color cathode ray tubes.

In the meantime, when the validity of the quality deterioration factor and the improvement contents cannot be confirmed by the validity confirming section 16, and the correctness of the quality deterioration factor and the validity of the improvement contents cannot be verified by the verifying section 17, the warning section 30 outputs a warning indicating that it has not been able to confirm the validity and correctness.

Further, the revision expediting section 31 presents candidates for the quality deterioration factor and requests revision of the production conditions of the line 1 for improving the quality deterioration factor.

Thus, an instruction for revising the production conditions of the line 1 for improving the quality deterioration factor is given to the operator. The operator revises the production conditions of the production line 1 for improving the quality deterioration factor.

When the production line 1 is improved by revising the production conditions of the line 1 in accordance with the improvement contents as the revision is expedited by the revision expediting section 31 or the feedback control section 18, the leaning section 32 additionally stores the improvement example in the quality improvement history database 13.

In the case where the automatic quality control system and human cooperate together to improve a totally unknown quality deterioration factor, by additionally storing the occurrence of already known errors, finding of the factor for the lowering of the yield and the improvement example, the performance of the self leaning of the automatic quality control device from then onwards can be improved.

Further, the self-leaning of the quality improvement method and the enhancement of the performance can be achieved. From these results, it is possible to detect the quality deterioration factor in an early stage and therefore it become able to make an improvement at an early stage. Therefore, with the present invention apparatus, a production line having a high and stable reliability can be established.

In addition, it is possible to find some other quality deterioration factors which have been hidden unknown, and therefore a further improvement of the quality and yield can be expected.

It should be noted that the present invention is not limited to the first to third embodiment, and therefore it is possible to remodel the invention in various modifications in practicing it as long as the essence of the invention is maintained.

For example, in the third embodiment, when the quality deterioration factor is improved by revising the production condition, such an improvement example is additionally stored in the quality improvement history data 13.

Other than the above, it is alternatively possible to store data of production conditions which cannot be allowed in the production of the products, in the quality improvement history data 12. With these measures, those production conditions which must not be carried out are not selected, and therefore a production line having a higher and more stable reliability can be established.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An automatic quality control method for a production line, comprising:

monitoring a plurality of production condition data for manufacturing products from a production line and product quality data indicating quality of manufactured products;

storing the production condition data and product quality data thus monitored in a database;

checking the production condition data to detect whether or not there is an event which deteriorates the quality of products;

extracting, if a quality deteriorating event is detected, a quality deteriorating factor which causes the quality deteriorating event and improvement content of production conditions against the quality deteriorating factor on the basis of the quality deteriorating event and the production condition data;

collating the quality deteriorating factor and the improvement content with improvement examples pre-stored for possible quality deteriorating factor, and confirming the validity of the quality deteriorating factor and the improvement content; and changing the production conditions for the production line in accordance with the improvement content.

2. An automatic quality control method according to claim 1, further comprising:

executing a simulation of manufacture of a product in the production line based on the quality deteriorating factor and improvement content thus extracted, verifying the correctness of the quality deteriorating factor and the validity of the improvement content, extracted from the result of the simulation; and changing, if the correctness of the quality deteriorating factor and the validity of the improvement content are verified, the production conditions for the production line in accordance with the improvement content.

3. An automatic quality control method according to claim 2, wherein said monitoring step comprises monitoring of the production condition data and the product quality data in the production line including a plurality of processes for each process.

4. An automatic quality control method according to claim 2, wherein the product quality data includes a judgment result indicating whether or not the products thus produced each have a preset production result, an examination result indicating whether or not the products each have pre-designed appearance and function, and a quality indicating a yield of the products produced.

5. An automatic quality control method according to claim 2, wherein said checking step includes detecting a sudden variation in an occurrence rate of the quality deterioration event and a yield of the product staying at its original yield while checking the product quality data.

6. An automatic quality control method according to claim 2, wherein said extracting step includes executing a data mining algorithm based on the quality deterioration event and the production condition data and thereby to extract the quality improvement factor and the improvement content.

7. An automatic quality control method according to claim 2, further comprising controlling the production conditions for the production line individually within respective specific values upon reception of the product quality data and the quality deterioration event.

8. An automatic quality control method according to claim 2, further comprising, when the validity of the quality deterioration factor and the improvement content is not confirmed in said collating step, and the correctness of the quality deterioration factor and the validity of the improvement content are not verified in said executing and verifying step:

outputting a warning indicating that the validity and correctness have not been confirmed; and presenting candidates for the quality deterioration factor and requesting revision of the production conditions for the production line to solve the quality deterioration factor.

9. An automatic quality control method according to claim 2, wherein said executing and verifying step includes:

verifying the validity of the quality deterioration factor extracted from the simulation result; and verifying the validity of the improvement content by judging whether or not a problem occurs in the production line when the production condition data for the production line are revised in accordance with the improvement content.

10. An automatic quality control method according to claim 2, further comprising:

learning an improvement example when the production line has been improved after the production conditions of the production line have been revised in accordance with the improvement content in said revising step.

11. An automatic quality control apparatus for a production line, comprising:

a production line configured to produce products;

a first database configured to store a plurality of production condition data for producing the products and product quality data indicating quality of the products;

a monitoring section configured to monitor a plurality of production condition data for product the products from the production line and further monitor the product quality data indicating the quality of the products, to store them in the first database;

an extraction section configured to check the production condition data to detect whether or not there is an event which deteriorate the quality of products, and to extract a quality deteriorating factor which causes the quality deteriorating event and improvement content of production conditions regarding the quality deteriorating factor on the basis of the quality deteriorating event and the production condition data;

a second database configured to store, in advance, improvement examples for the quality deterioration factor;

a validity confirming section configured to confirm the validity of the quality deteriorating factor and the improvement content by collating the quality deteriorating factor and the improvement content extracted by the extracting section with the improvement examples pre-stored in the second database; and a feedback control section configured to revise the production conditions for the production line in accordance with the improvement content.

12. An automatic quality control apparatus for a production line, according to claim 11, further comprising:

a verifying section configured to execute a simulation of production of the products in the production line under current production conditions, and to verify the correctness of the quality deteriorating factor and the validity of the improvement content from a result of the simulation, wherein the feedback control section is configured to revise the production conditions for the production line in accordance with the improvement content when the correctness of the quality deteriorating factor and the validity of the improvement content are verified.

13. An automatic quality control apparatus for a production line, according to claim 12, wherein the first data base configured to store the product condition data, a judgment result indicating whether or not the products thus produced each have a preset production result, an examination result indicating whether or not the products each have pre-designed appearance and function, and the product quality data indicating a yield of the products produced.

14. An automatic quality control apparatus for a production line, according to claim 12, wherein the extracting section configured to detect a sudden variation in an occurrence rate of the quality deterioration event and a yield of the product staying at its original yield while checking the product quality data.

15. An automatic quality control apparatus for a production line, according to claim 12, wherein the extracting section configured to execute a data mining algorithm based on the quality deterioration event and the production condition data and thereby to extract the quality improvement factor and the improvement content.

16. An automatic quality control apparatus for a production line, according to claim 12, further comprising
a warning section configured to output a warning indicating that the validity and correctness have not been confirmed, when the validity of the quality deterioration factor and the improvement content are not confirmed in said validity confirming section, and the correctness of the quality deterioration factor and the validity of the improvement content are not verified in the verifying section; and
a revise expediting section configured to present candidates for the quality deterioration factor and to request revision of the production conditions for the production line to solve the quality deterioration factor.

17. An automatic quality control apparatus for a production line, according to claim 12, further comprising: a learning section configured to learn an improvement example when the production line has been improved after the production conditions of the production line have been revised in accordance with the improvement content by the feedback control section.

18. An automatic quality control program for a production line, comprising:
monitoring a plurality of production condition data for manufacturing color cathode ray tubes from a production line and product quality data indicating quality of manufactured products;
storing the production condition data and product quality data thus monitored in a database;
checking the production condition data to detect whether or not there is an event which deteriorates the quality of products;
extracting, if a quality deteriorating event is detected, a quality deteriorating factor which causes the quality deteriorating event and improvement content of production conditions against the quality deteriorating factor on the basis of the quality deteriorating event and the production condition data;
collating the quality deteriorating factor and the improvement content with improvement examples pre-stored for possible quality deteriorating factor and confirming the validity of the quality deteriorating factor and the improvement content; and changing the production conditions for the production line in accordance with the improvement content.

19. An automatic quality control program according to claim 18, further comprising:
executing a simulation of manufacture of a product in the production line based on the quality deteriorating factor and improvement content thus extracted, and verifying the correctness of the quality deteriorating factor and the validity of the improvement content, extracted from the result of the simulation; and
changing, if the correctness of the quality deteriorating factor and the validity of the improvement content are verified, the production conditions for the production line in accordance with the improvement content.

20. An automatic quality control program according to claim 19, further comprising:
outputting a warning indicating that the validity and correctness have not been confirmed, when the validity of the quality deterioration factor and the improvement content is not confirmed in said collating and confirming procedure, and the correctness of the quality deterioration factor and the validity of the improvement content are not verified in said executing and verifying procedure; and
presenting candidates for the quality deterioration factor and requesting revision of the production conditions for the production line to solve the quality deterioration factor.

21. An automatic quality control program according to claim 19, wherein said executing and verifying procedure includes:
verifying the validity of the quality deterioration factor extracted from the simulation result; and
verifying the validity of the improvement content by judging whether or not a problem occurs in the production line when the production condition data for the production line are revised in accordance with the improvement content.

22. An automatic quality control program according to claim 19, further comprising:
learning an improvement example when the production line has been improved after the production conditions of the production line have been revised in accordance with the improvement content in said revising procedure.

* * * * *